No. 843,682. PATENTED FEB. 12, 1907.
F. N. MACLEOD & C. A. RICH.
CHUCK.
APPLICATION FILED NOV. 15, 1901.
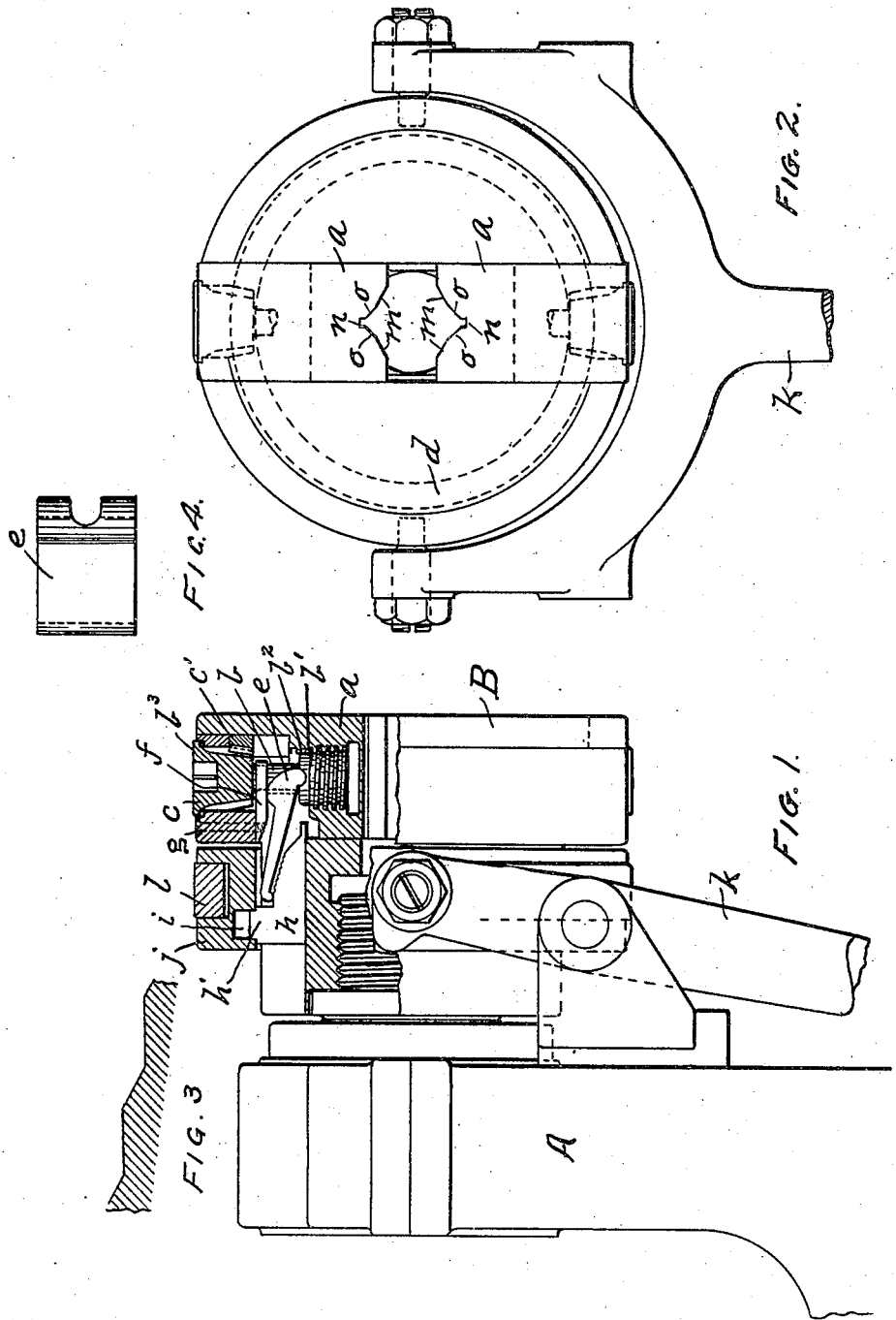
WITNESSES,
James H. Thurston
Catherine G. Bradley.
INVENTORS,
Frank N. Macleod, Charles A. Rich,
BY Wilmarth H. Thurston
ATT'Y.

UNITED STATES PATENT OFFICE.

FRANK N. MACLEOD, OF EAST PROVIDENCE, AND CHARLES A. RICH, OF PROVIDENCE, RHODE ISLAND, ASSIGNORS TO BROWN & SHARPE MANUFACTURING COMPANY, OF PROVIDENCE, RHODE ISLAND, A CORPORATION OF RHODE ISLAND.

CHUCK.

No. 843,682.     Specification of Letters Patent.     Patented Feb. 12, 1907.

Application filed November 15, 1901. Serial No. 82,398.

*To all whom it may concern:*

Be it known that we, FRANK N. MACLEOD, of East Providence, and CHARLES A. RICH, of Providence, both in the county of Providence and State of Rhode Island, have jointly invented certain new and useful Improvements in Chucks; and we do hereby declare the following specification, taken in connection with the accompanying drawings, forming a part of the same, to be a full, clear, and exact description thereof.

The object of the invention is to provide a chuck of the lathe-chuck type—that is, a chuck having radially-adjustable jaws—in which the jaws may not only be adjusted for different sizes of stock, but may also be readily opened and closed for removing and inserting the work or to permit the stock to be fed, thereby adapting the chuck for use in an automatic screw-machine or other similar machines in which a rod of stock is to be intermittently fed through the chuck.

The invention consists in the combinations and arrangements of parts hereinafter described and claimed.

Referring to the drawings, Figure 1 is a side elevation of a chuck embodying our invention, together with a portion of one of the bearings for the chuck-spindle, the same being partly in section. Fig. 2 is an end elevation thereof, and Figs. 3 and 4 are details.

A is one of the bearings for the spindle, to which the chuck B is secured. The chuck-jaws $a$ are arranged to slide in radial ways formed in the body of the chuck. Each of these jaws is provided with an adjusting-screw $b$ for adjusting the jaw toward and from the axis of the chuck, whereby the jaws may be adjusted to act upon stock of different diameters. The head $c$ of each of said adjusting-screws is provided with gear-teeth $c'$, and an annular rack $d$, mounted to turn in the body of the chuck, is arranged to engage the gear-teeth on each of said adjusting-screws and so that a turning of either one of the screws $b$ will serve to adjust both jaws simultaneously toward or from the axis of the chuck.

A shoulder $b'$ is formed on each of the adjusting-screws $b$, and on this shoulder rests a bearing-plate $b^2$. Arranged to bear against said bearing-plate is a lever $e$, said lever being forked at its end, as shown in Fig. 4, to embrace the shank of the screw. Each lever $e$ is fulcrumed upon a bearing-plate $f$. In the constructions shown in the drawings said bearing-plates $f$ are detachably secured to a ring $g$, which ring is in turn secured to the body of the chuck, so as to become, in effect, a part thereof; but the construction in this respect is immaterial, it being simply necessary that there be a fixed abutment for the lever to bear against and turn upon. The lever, backed up by the fixed bearing-plate $f$, serves as a bearing for the adjusting-screw when the latter is turned to move the jaw inward. The head of each screw is provided with an annular flange $b^3$, which enters a countersunk recess in the ring $g$, secured to the body of the chuck, the bottom of said recess serving as a bearing for the screw when it is turned to move the jaw outward.

Wedges $h$, one for each jaw, are arranged to slide in suitable grooves or ways formed in the body of the chuck, the forward end of the wedge being arranged to act upon the tail of the lever $e$, as shown in Fig. 1. When the wedge is forced forward, it will act to turn the lever $e$ upon its fulcrum, thereby forcing the jaw inward to grip the stock. When the wedge is withdrawn, the jaw will be released. A sufficient clearance between the under side of the flange $b^3$ and the bottom of the recess in the ring $g$ is provided to permit of the requisite inward movement of the jaw and adjusting-screw under the action of the wedge $h$. Preferably a clearance between the gear-teeth $c'$ and the teeth of the annular rack $d$ is also provided sufficient to prevent binding of the parts when the adjusting-screw is thus moved inward. Each of the wedges is provided with a lug or projection $h'$, adapted to enter an annular groove $i$, formed on the inside of a sliding sleeve or collar $j$. When a sliding movement is imparted to the sleeve $j$, both of the wedges will be actuated and both jaws will be simultaneously opened or closed. Any suitable means may be employed for sliding the sleeve $j$ in one direction or the other. In the drawings is shown a forked lever $k$, engaging a ring $l$, located in an annular groove formed in the outer periphery of the sliding sleeve. The lever $k$ may be opened by hand or automatically.

With the above construction the jaws $a$ may be adjusted toward or from the axis of the chuck, thereby adapting the chuck for use in connection with stock of different sizes, while by sliding the sleeve *j* forward the jaws will be forced inward to grip the stock, and by sliding the sleeve in the opposite direction the jaws will be opened or released to permit the removal of the work or the feeding of the stock. Preferably the faces of the wedges are formed with a series of steps, as shown, the back of each step being slightly inclined, as shown on an enlarged scale in Fig. 3, whereby the wedges will be securely held against any accidental movement and the jaws thereby locked in their gripping position, while at the same time the wedges may readily be withdrawn by the movement of the sliding sleeve.

In the drawings two jaws are shown; but it will be understood that any desired number of jaws may be employed. It is preferred, however, to employ two jaws and to form the faces of the jaws as shown in the drawings, as thereby the chuck is adapted to grip and hold not only round or hexagonal stock, but also stock that is square in cross-section. As shown in Fig. 2, the main faces *m m* of each jaw are formed at an angle of one hundred and twenty degrees to each other, the jaws being thereby adapted to grip and hold either round or hexagonal stock. Instead of the faces *m m* coming to a meeting-point the jaw is cut away to form a recess *n* at this point. By this construction the jaws are adapted to grip and hold stock that is square in cross-section, as well as round or hexagonal stock, the corners of the square stock being received within the recesses *n n*. To facilitate the gripping of square stock, supplemental faces *o o* are preferably formed in the jaw adjacent to the recess *n*, said supplemental faces being at an angle of ninety degrees to each other. These supplemental faces, however, are not necessary, and the jaws may be simply rounded at this point, or the faces *m m* may be extended until they meet the walls of the recess *n*.

As will be seen the chuck while it embodies leverage for actuating the jaws is nevertheless simple and compact, the combination of parts being such that the sliding sleeve may be arranged to overlie the actuating-wedges and with the ends of the levers extending between the wedges and said sliding sleeve. While it is preferred to have practically the entire sliding sleeve overlie the wedges, as shown, it is obvious that the sliding sleeve may be so located with relation to the wedges as to only partially overlie the same without changing the operation and without materially effecting the compactness of the chuck.

What we claim as our invention, and desire to secure by Letters Patent, is—

1. In a chuck, the combination, with the chuck-body, of radially-movable jaws, levers for actuating said jaws, wedges for operating said levers, and a sliding sleeve overlying said wedges for actuating the same, substantially as described.

2. In a chuck, the combination, with the chuck-body, of radially-adjustable jaws, screws for adjusting said jaws toward or from the axis of the chuck, levers arranged to act upon said adjusting-screws, wedges for operating said levers, and a sliding sleeve overlying said wedges for actuating the same, substantially as described.

3. The combination with a chuck-body of two jaws arranged to slide radially therein, each of said jaws being provided with converging faces adapted to engage and hold round or hexagonal stock and with a notch or recess at the angle between said converging faces, whereby said jaws are also adapted to engage and hold stock which is square in cross-section.

4. The combination with a chuck-body of two jaws arranged to slide radially therein, each of said jaws being provided with converging faces adapted to engage and hold round or hexagonal stock, and with supplemental faces adapted to engage and hold stock which is square in cross-section.

5. In a chuck, the combination, with the chuck-body, of radially-adjustable jaws, screws for adjusting said jaws toward or from the axis of the chuck, levers arranged to bear on said adjusting-screws and also to bear against the chuck-body, wedges for operating said levers, and a sliding sleeve for actuating said wedges, the end of the lever extending between its operating-wedge and said sliding sleeve, substantially as described.

FRANK N. MACLEOD.
CHARLES A. RICH.

Witnesses:
W. H. THURSTON,
J. H. THURSTON.